United States Patent
Park

(10) Patent No.: US 7,137,896 B2
(45) Date of Patent: Nov. 21, 2006

(54) MULTI-ROLLER BALL FOR CONSTANT VELOCITY JOINTS

(76) Inventor: Jungho Park, 3471 Burnham Rd., Ann Arbor, MI (US) 48108

(*) Notice: Subject to any disclaimer, the term of this patent is extended or adjusted under 35 U.S.C. 154(b) by 0 days.

(21) Appl. No.: 10/728,862

(22) Filed: Dec. 8, 2003

(65) Prior Publication Data
US 2005/0124421 A1    Jun. 9, 2005

(51) Int. Cl.
*F16D 3/223* (2006.01)
(52) U.S. Cl. .................................. 464/145; 464/906
(58) Field of Classification Search ............... 464/15, 464/132, 139–146, 150, 151, 906; 384/49, 384/491, 565, 567, 568; 475/220, 222; 29/899, 29/899.1; 16/21, 24–26; 403/128, 131
See application file for complete search history.

(56) References Cited

U.S. PATENT DOCUMENTS

| | | | | |
|---|---|---|---|---|
| 367,387 A | * | 8/1887 | Goetz ............................. 16/28 |
| 381,476 A | * | 4/1888 | Lehmann ........................ 16/28 |
| 1,454,057 A | * | 5/1923 | Kuttner ........................ 384/568 |
| 3,441,299 A | * | 4/1969 | Pfaar ........................... 403/131 |
| 5,069,571 A | * | 12/1991 | Matczak et al. ........... 403/131 X |
| 6,009,659 A | * | 1/2000 | Shannon et al. |
| 6,227,978 B1 | * | 5/2001 | Maucher et al. .......... 464/132 X |

FOREIGN PATENT DOCUMENTS

IT         292730     * 12/1935    ............... 384/568

* cited by examiner

*Primary Examiner*—Greg Binda

(57) ABSTRACT

A constant velocity joint includes an outer joint member, an inner joint member, torque transmitting ball assemblies guided in pairs of tracks, and a cage having windows for receiving the ball assemblies and cage webs defined between the windows. Each ball assembly comprises a slide shaft having lugs at the ends, a roller shaft rotatably and slidably disposed on the slide shaft, and a first and second annular sub-rollers rotatably disposed on the roller shaft. Each of cage webs includes web grooves formed radially at the circumferential faces, engaging the lugs of the slide shaft, thereby allowing a limited radial movement of the ball assembly relative to the cage window, and transmitting any axial force to and from the ball assembly. The ball assemblies reduce the friction loss and wear of constant velocity joints by providing the sub-rollers that roll independently on the inner or outer tracks.

8 Claims, 6 Drawing Sheets

MULTI-ROLLER BALL FOR CONSTANT VELOCITY JOINTS

BACKGROUND OF THE INVENTION

1. Field of the Invention

This invention relates to the ball type constant velocity joints. In particular, the invention relates to a ball assembly in the form of a sphere divided up into a plurality of rollers (rolling elements) and a common shaft that holds the rollers. The purpose of the invention is to reduce the friction loss and wear of the constant velocity joints.

2. Description of the Prior Art

Universal joints (Cardan joint or Hooke joint) have been used for transmitting a driving torque and spin motion from one propeller shaft to another at an arbitrary articulation (joint) angle between the two shafts. Universal joints comprise a cross-shaped spider as a torque-transmitting member, and two Y-shaped end yokes each at end of the shafts. Universal joints lack the constant-velocity characteristic, because the spider is not positioned on a homokinetic plane (bisecting angle plane or constant velocity plane) when the joint is at a non-zero articulation angle. As a result, universal joints suffer from a torsional vibration problem that aggravates as the articulation angle increases.

Constant velocity joints solve this problem by offering a virtually zero variation of the spin speed across the input and output shafts. Most of the constant velocity joints use a plurality of torque-transmitting balls that are solid steel spheres. The types of the constant velocity joints that use torque-transmitting balls are the Rzeppa joint [U.S. Pat. No. 2,046,584 filed July 1924 by A. H. Rzeppa], the undercut free joint [U.S. Pat. No. 3,879,960, filed July 1975 by H. Welschof et al], the cross groove joint [U.S. Pat. No. 2,322,570 filed June 1943 by A. Y. Dodge], and the double offset joint [U.S. Pat. No. 1,975,758 filed October 1934 by B. K. Stuber]. Any type of constant velocity joint comprises the inner race (inner joint part), outer race (outer joint part), ball cage (retainer) and the balls. The outer race usually forms a bell-shaped member that comprises a shaft, a base, an aperture and outer ball grooves (tracks) that are machined on its bore surface. The inner race forms a hub that comprises a shaft and inner ball grooves that are machined on its outer surface. The ball cage is positioned between the outer race and the inner race, and comprises circumferentially distributed cage windows (pockets) that hold the balls in the central plane of the ball cage. The inner and outer groove pairs form a special kinematic arrangement that steers (drives) the balls to the homokinetic plane.

But constant velocity joints suffer from five distinct disadvantages: 1) they lose some amount of power to sliding friction; 2) the frictional heat could produce high temperature; 3) this high temperature limits the permissible operating speeds and loads; 4) the friction decreases the durability and life of the joints; and 5) the friction, when coupled with a certain operating condition, could lead to a binding (friction lock) problem. See for example, "Universal Joint and Driveshaft Design Manual," The Society of Automotive Engineers, Inc. 400 Commonwealth Drive, Warrendale, Pa. 15096, ISBN 0-89883-007-9, 1979, pp. 100; and Philip J. Mazziotti, "Dynamic Characteristics of Truck Driveline Systems," The Eleventh L. Ray Buckendale Lecture, The Society of Automotive Engineers, Inc., SP 262, pp. 21.

From the viewpoint of kinematics, the balls of a constant velocity joint cannot have a true rolling condition, because the grooves are not concentric but generally intersect to each other. From the viewpoint of dynamics, each ball is steered (located) to the bisecting plane by the combined action of the inner groove, the outer groove and the cage window. This means that there are at least three contact points on a ball, when a constant velocity joint is spinning under the torque load: the ball to inner groove contact, the ball to outer groove contact, and the ball to cage window contact. Obviously, the ball cannot retain a true rolling condition at all three contact points at the same time. Therefore, some or all of the contact points on a ball cannot but undergo a sliding contact or friction.

Previous attempts by others to reduce the friction problem of constant velocity joints have employed special lubricant. These attempts, however, have not proven to completely solve the friction problem, because such measure can only reduce the friction coefficient value.

BRIEF SUMMARY OF THE INVENTION

It is an object of the present invention to provide torque-transmitting balls for constant velocity joints, while reducing or eliminating the sliding friction of the balls against the surfaces of its mating inner groove, outer groove, and the cage window.

The present invention for a "multi-roller" ball provides the foregoing object, and thus offers significant improvements over the prior art. As its name implies, the multi-roller ball assembly has a plurality of sub-rollers, each of which contacts and rolls independently on its mating outer groove and inner groove. None has embodied the concept of the multi-roller ball to cause its each sub-roller to roll independent from each other, and thus to cause the reduction or elimination of the sliding friction problem in constant velocity joints.

The multi-roller ball offers the advantages of enabling any ball-type constant velocity joints to have a reduced internal friction loss; to have a smooth articulation and plunge; to have a lower operating temperature; to have an increased durability and life; and to have a higher operating speed and larger torque capacity.

The multi-roller ball enjoys these advantages because it has a plurality of sub-rollers rotating independently from each other around a common shaft called the roller shaft. Therefore, in a constant velocity joint receiving a torque load, one sub-roller can roll freely on an outer groove, while another sub-roller rolls on an inner groove. This multi-roller construction relieves the ball assembly from a harmful sliding friction at its rolling contact points. In order to maintain the orientation of the roller shaft along the circumferential direction of the cage window, a slide shaft is provided in such a manner that it can slide along the shaft hole through the axis of the roller shaft and that the lugs at both ends of the slide shaft engage the cage-web grooves that are machined at either sides of the cage webs towards the radial direction. Thus, the multi-roller ball achieves the implementation of the objectives mentioned above in a commercially viable component that is simple and inexpensive enough to be easily applicable to any existing ball-type constant velocity joints.

Further objectives and advantages of the multi-roller ball will become apparent from consideration of the drawings and descriptions that follow. Therefore, to the accomplishment of the objectives described above, this invention consists of the features hereinafter illustrated in the drawings, fully described in the detailed description of the preferred embodiments and particularly pointed out in the claims. However, such drawings and descriptions disclose but some of the various ways in which the invention may be practiced.

DETAILED DESCRIPTION OF THE INVENTION

Figure 1:
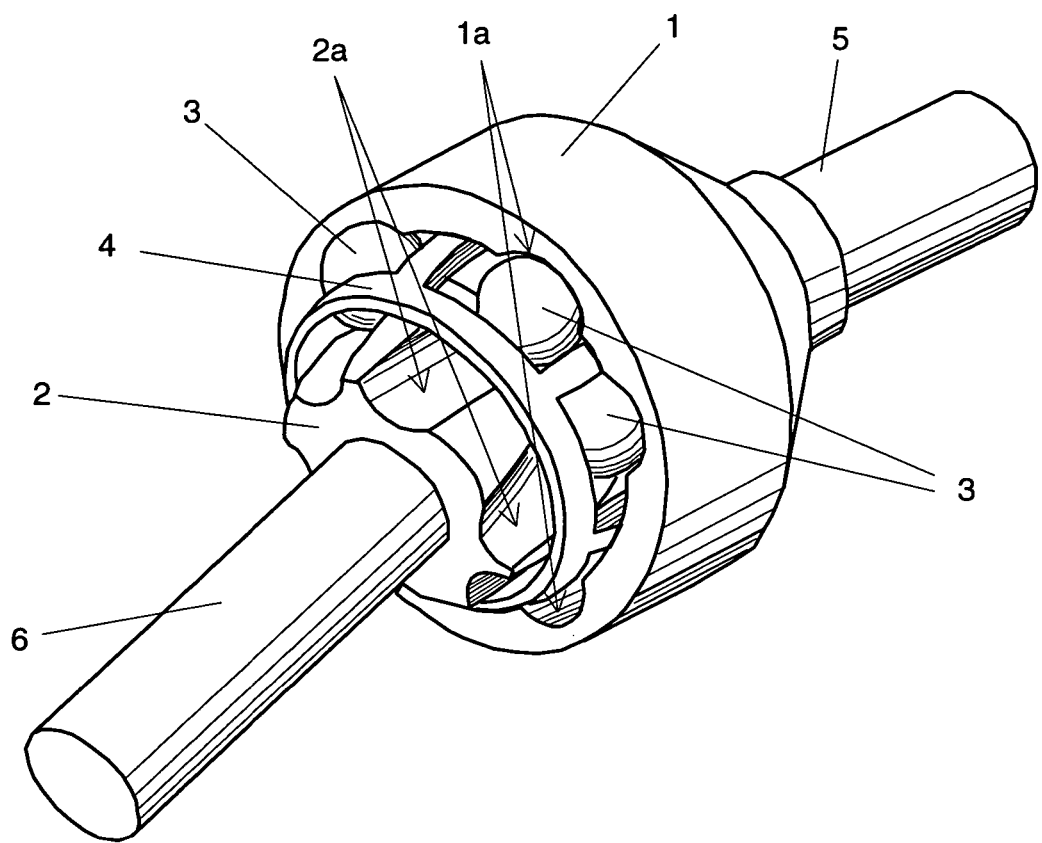
FIG. 1 is a perspective view of a prior-art constant velocity joint.
Figure 2:
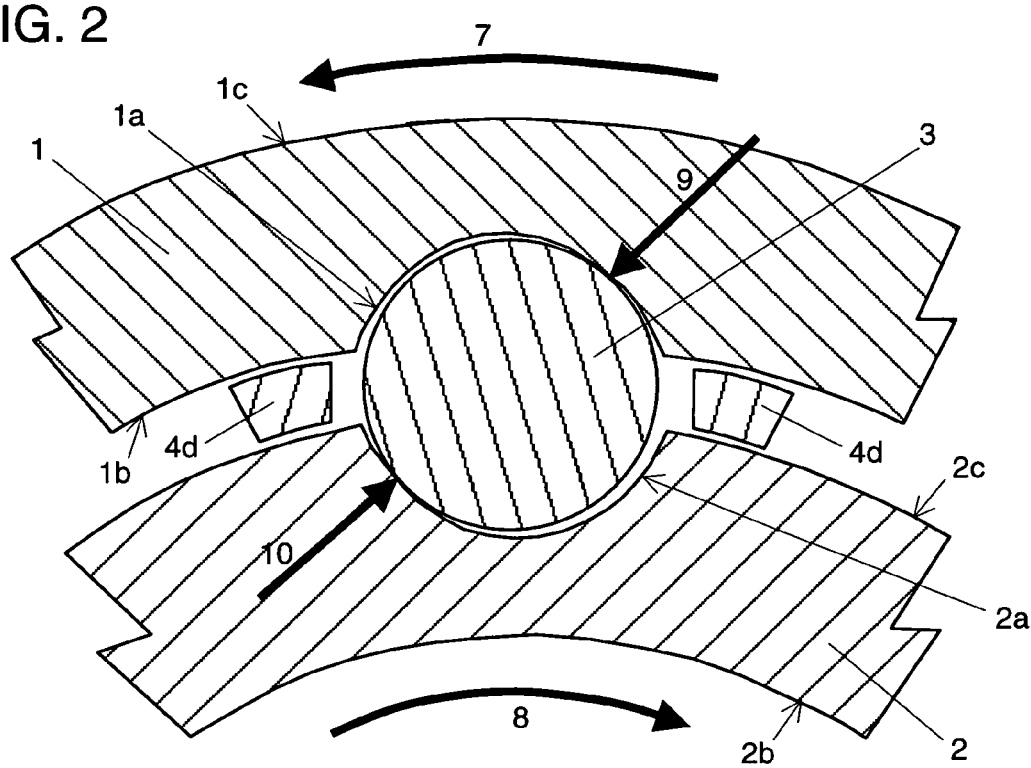
FIG. 2 shows a prior-art constant velocity joint under a torque load in a partially enlarged central plane section, illustrating the contact points of a ball against the inner and outer grooves.
Figure 3:
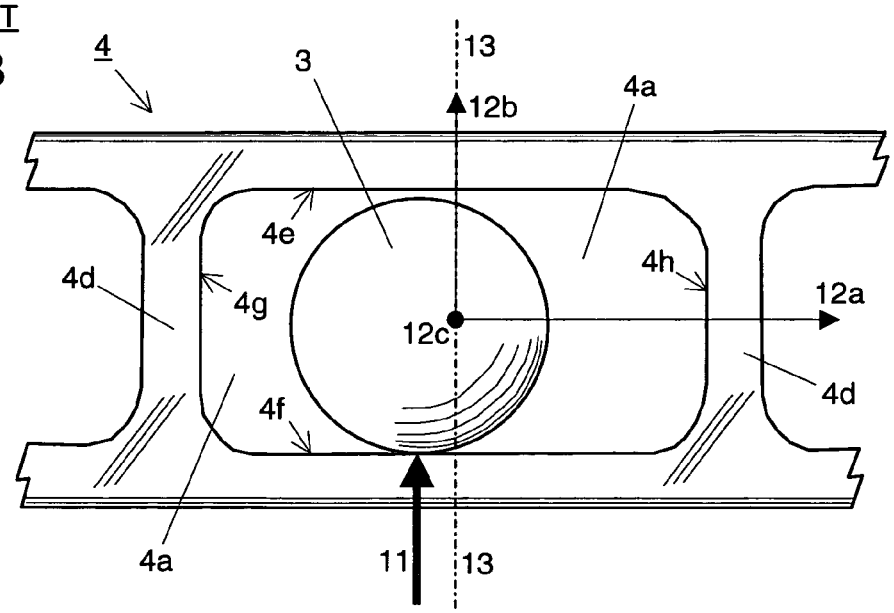
FIG. 3 is a partially enlarged radial view of a prior-art constant velocity joint, showing the contact between the ball and the cage window (the outer and inner races are not shown).

Referring to the drawings, where like parts are designated throughout with like numerals and symbols, FIGS. 1 through 3 depict a prior art constant velocity joint, presented herein as an illustration of its general construction and inherent problem. A constant velocity joint comprises the outer race (outer joint part) 1, the inner race (inner joint part) 2, the cage (retainer) 4, and the balls 3. The outer race shaft 5 is either integral to the outer race 1, or securely connected to the outer race 1 by bolts or splines. The inner-race shaft 6 is typically connected to the inner race 2 by splines and retaining rings. The outer race 1 has a plurality of ball grooves (tracks) 1a machined on its bore surface, while the inner race 2 has the pairing set of ball grooves (tracks) 2a machined on its outer circumference surface. The positions of the balls 3 are restrained by the outer grooves 1a and the inner grooves 2a. The cage 4 has a plurality of the windows (pockets) 4a that hold the balls 3 so that all of the balls 3 are located on the central plane of the cage 4. The combined actions of the outer grooves 1a, the inner grooves 2a and the cage windows 4a steer (locate) the balls 3 towards the constant velocity plane (bisecting-angle plane or homokinetic plane), yielding a constant velocity characteristics at any joint articulation angle.

FIG. 2 shows a partially enlarged central-plane section of a prior-art constant velocity joint that is receiving an external torque load 7, 8. The driving torque 7 onto the outer race 1 tries to rotate it to the counter-clock-wise direction, while the reaction torque load 8 onto the inner race 2 tries to rotate it to the clock-wise direction, resisting against the motion of the outer race 1. This action and reaction produce the contact forces 9, 10 onto the ball 3. The contact force 9 from the outer groove 1a to the ball 3 and another contact force 10 from and the inner groove 2a to ball 3 squeeze the ball 3. Thus each ball 3 has at least two contact points against its mating inner groove 2a and the outer groove 1a.

FIG. 3 is a partially enlarged radial view of a prior-art constant velocity joint; showing the contact condition between the cage 4 and the ball 3. Note that the outer race 1 and the inner race 2 are omitted in FIG. 3. Typically a cage 4 has a shape of two rings that are bridged together by the cage webs 4d. In FIG. 3, the cage window (pocket) 4a is oriented such that its radial direction 12c is out-of-paper direction, its tangential or circumferential direction 12a is to the right-hand side, and its axial direction 12b is parallel to the cage axis 13. Each cage window 4a has two cage flat surfaces 4e, 4f and another two web flat surfaces 4g, 4h. The distance between the two cage-flat surfaces 4e, 4f are generally called the window width. The window width is typically designed to be equal to or slightly larger than the diameter of the ball 3. One of the main functions of the cage 4 is to push the ball 3 towards the homokinetic plane by generating the contact force 11 against the ball 3. Thus at any given moment, a ball 3 has at least one contact point against one of the cage flat surfaces 4e and 4f. The distance between the two opposing web flat surfaces 4g, 4h are generally called the window length. The window length is typically designed to have an enough gap from the ball 3 in order to accommodate any circumferential movement of the balls 3 during the joint articulation.

Therefore, each ball 3 of a prior-art constant velocity joint has at least three contact points (forces): The first contact point is against the outer groove 1a, the second one is against the inner groove 2a, and the third one is against the cage window 4a (in other words, the cage flat 4e or 4f). As a result, it is inevitable that the ball 3 undergoes a sliding friction at some or all of the three contact points as the ball 3 is steered to another position. It is well known that this sliding friction could produce many problems such as the friction loss and the friction lock (binding), which could result in the heat generation and eventually the failure of the joint (durability problem). The goal of this invention is to prevent or reduce the friction-induced problems of the conventional ball-type constant velocity joints. This invention solves the problem by replacing the solid balls 3 with the multi-roller balls 20 that make the three contact points of each ball be independent from each other, thus positively eliminating the sliding friction.

Figure 4:
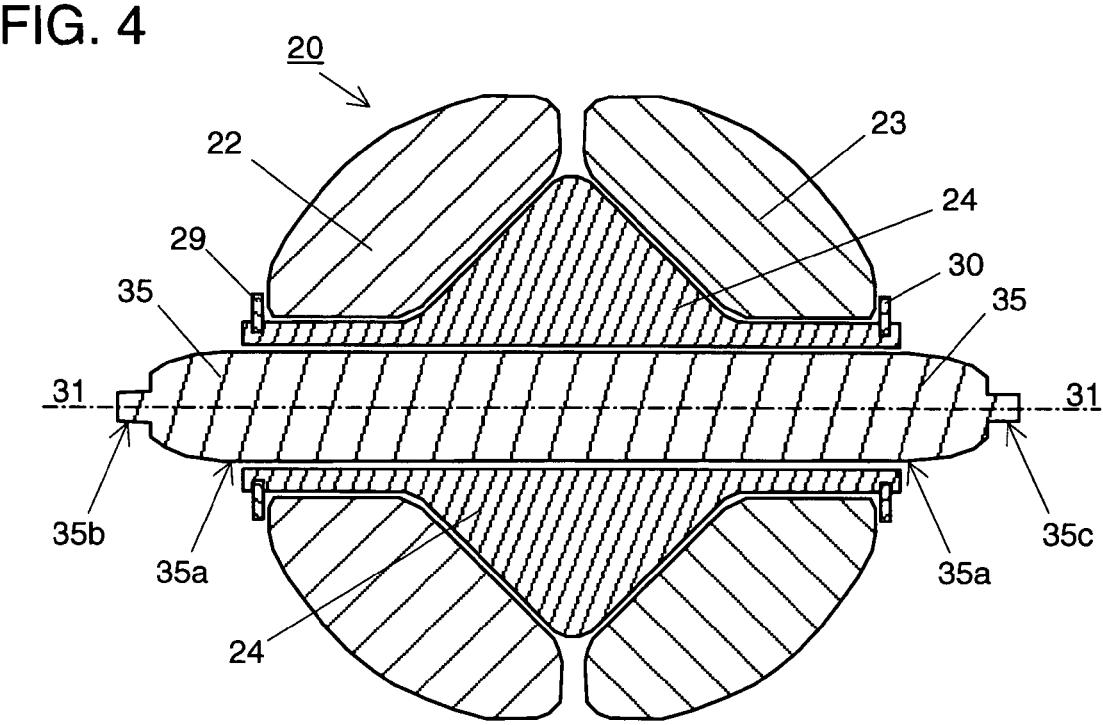
FIG. 4 shows a multi-roller ball assembly in a longitudinal (spin-axis) section, illustrating the assembly of the two half-spherical sub-rollers, the roller shaft, and the slide shaft.
Figure 5:
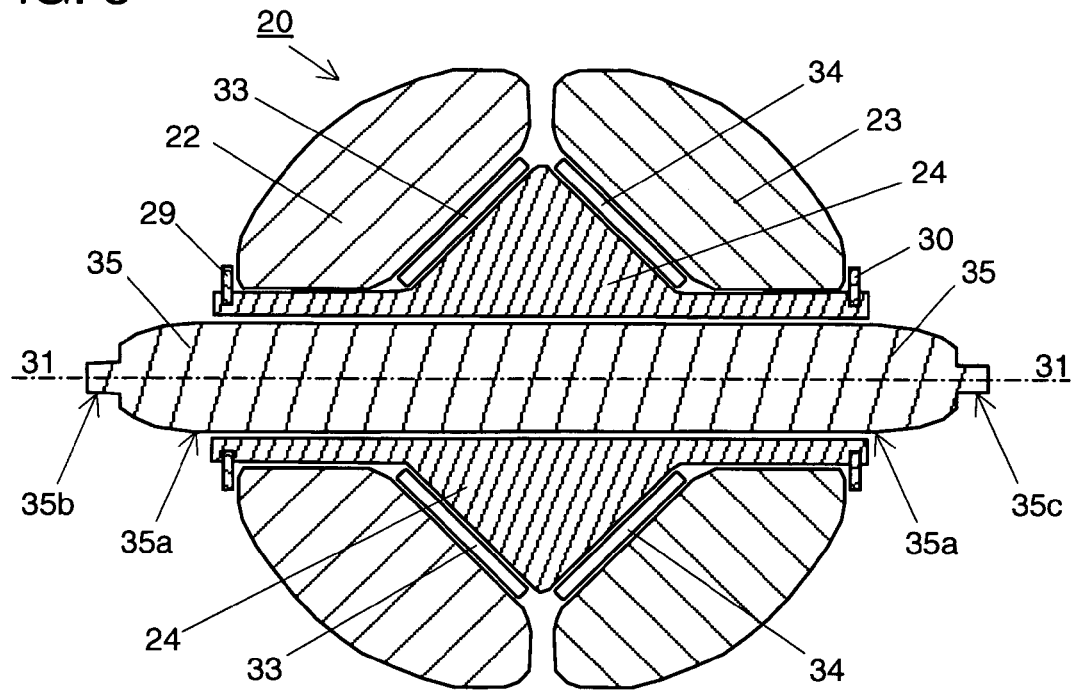
FIG. 5 shows a multi-roller ball assembly in a longitudinal (spin-axis) section, revealing the first and second needle bearings disposed between the roller shaft and the two half-spherical sub-rollers.

FIG. 4 shows the longitudinal (spin-axis) section of a multi-roller ball assembly 20 in its preferred embodiment, illustrating the assembled state of its members. A multi-roller ball assembly 20 comprises two substantially half-spherical annular sub-rollers 22, 23, the roller shaft 24, and the slide shaft 35. In addition to these key components, sliding or needle bearings 33, 34 for the sub-rollers 22, 23 may be optionally employed for the enhanced performance as shown in FIG. 5. Likewise, two retaining rings 29, 30 may be employed at the either ends of the roller shaft 24 to hold the members together, facilitating the assembly of the multi-roller ball assemblies 20 into a constant velocity joint. The sub-rollers 22, 23 can spin individually around the roller shaft 24, allowing them to contact and freely roll on the outer groove 1a and the inner groove 2a of a constant velocity joint. The roller shaft 24 serves as a spindle for the sub-rollers 22, 23, and the aperture along its axis serves as a sliding guide for the slide shaft 35. The slide shaft 35 maintains the spin axis orientation of the multi-roller ball 20 relative to the cage window 4a by engaging its lugs 35a, 35b with the webs 4d as will be explained further in FIGS. 8 and 9. The slide shaft 35 takes any forces between the multi-roller ball 20 and the cage 4. In addition, the slide shaft 35 allows the roller shaft 24 to slide longitudinally the slide shaft 35 so that a limited circumferential movement of the multi-roller ball assembly 20 relative to the cage window 4a is accommodated. Since a multi-roller ball assembly 20 has a first and second sub-rollers 22, 23 that spin independently from each other, it can positively eliminate or reduce any frictional sliding contact against the outer groove 1a and the inner groove 2a.

Figure 6A:
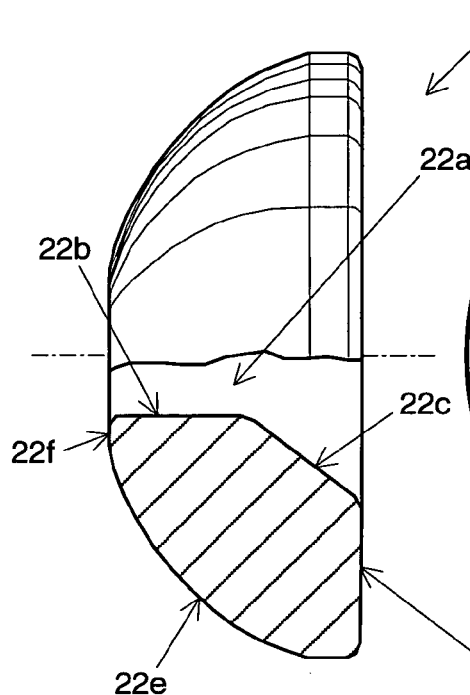
FIGS. 6A and 6B are the front and side views of the half-spherical sub-roller.
Figure 6B:
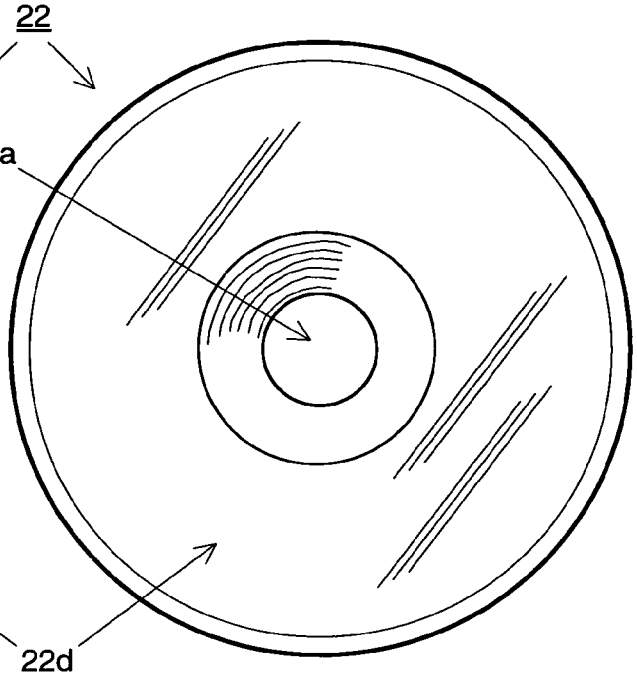

FIGS. 6A and 6B show the front and side views of the sub-roller 22 or 23. Its center aperture 22a that comprises the cylindrical bore surface 22b and the tapered bore surface 22c rides on the roller shaft 24 directly or via the bearing 27 or 28. The spherical surface 22d contacts against the outer race grooves 1a or inner race grooves 2a. The inner flat surface 22e provides a gap against the adjacent sub-roller. The outer flat surface 22f is intended for reducing the axial length (except the slide shaft 35) of the multi-roller ball assembly 20 so that the length of the cage window (the distance between 4g and 4h) can be designed to be shorter. The outer flat surface 14f can also serve as a thrust surface against the retaining rings 29, 30.

Figure 7A:
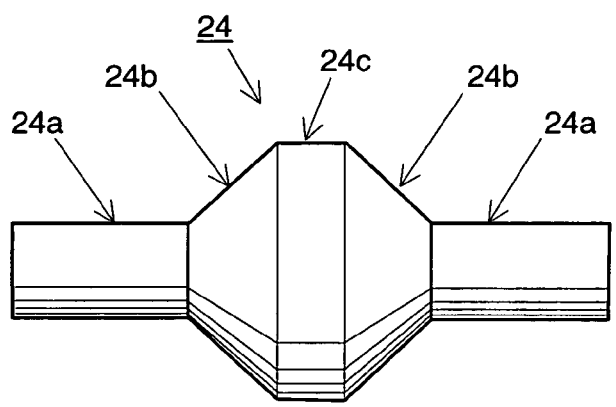
FIGS. 7A and 7B are the front and side views of the roller shaft.
Figure 7B:
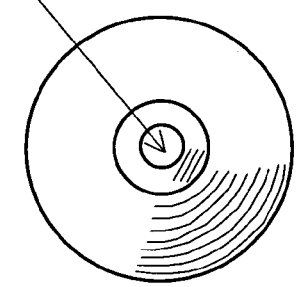
Figure 8:
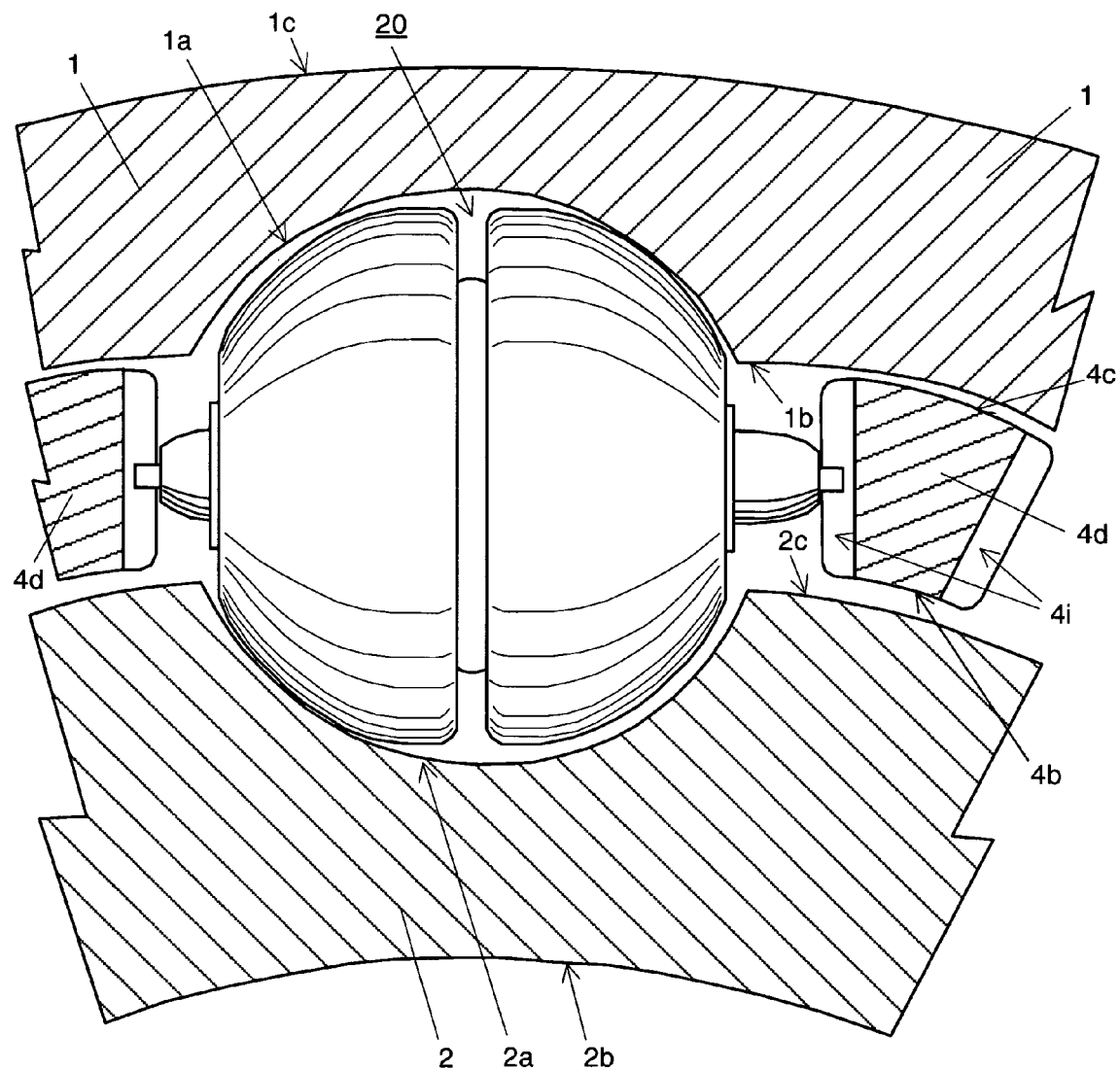
FIG. 8 shows an actual use of a multi-roller ball in a constant velocity joint in a partially enlarged central plane section, revealing the contact points of the half-spherical sub-rollers against the inner and outer grooves.

FIGS. 7A and 7B show the front and side views of the roller shaft 24. Its cylindrical shaft surface 24a and the tapered surface 24b mate onto the bearings 33, 34 or directly onto the sub-rollers 22, 23. The central ridge surface 24c serves as a transition between the two neighboring tapered surfaces. The aperture 24d is for the slide shaft 35 that can freely spin within or move along the aperture 24d. The candidate materials for the roller shaft 24 are a solid metal, an oil-impregnated sintered metal, or any other sliding bearing material FIG. 8 shows an actual use of a multi-roller ball 20 in a constant velocity joint in a partially enlarged central plane section, revealing the contact point of the sub-rollers 22, 23 against the inner and outer grooves 1a and 2a. The multi-roller balls 20 can be used in conjunction with any type of constant velocity joint, except that the cage 4 should have additional cage web grooves 4i machined to radial direction at each web flat surfaces 4g and 4h. The cage web grooves 4i mate with the ends of the slide shaft 35, constraining the orientation of each multi-roller ball assembly 20 with respect to the corresponding cage window 4a. For most of the ball-type constant velocity joints, the inner and outer ends of cage web grooves 4i are blocked by the outer race bore surface 1b and the inner race outer surface 2c. Therefore, the ends of the slide shaft 35 cannot disengage from the cage web grooves 4i. However, in the case of the cross groove type constant velocity joints, the cage bore side of the cage web grooves 4i should be closed so that the ends of the slide shaft 35 do not fall to the gap between the cage bore surface 4b and the inner race outer surface 2c.

Figure 9:
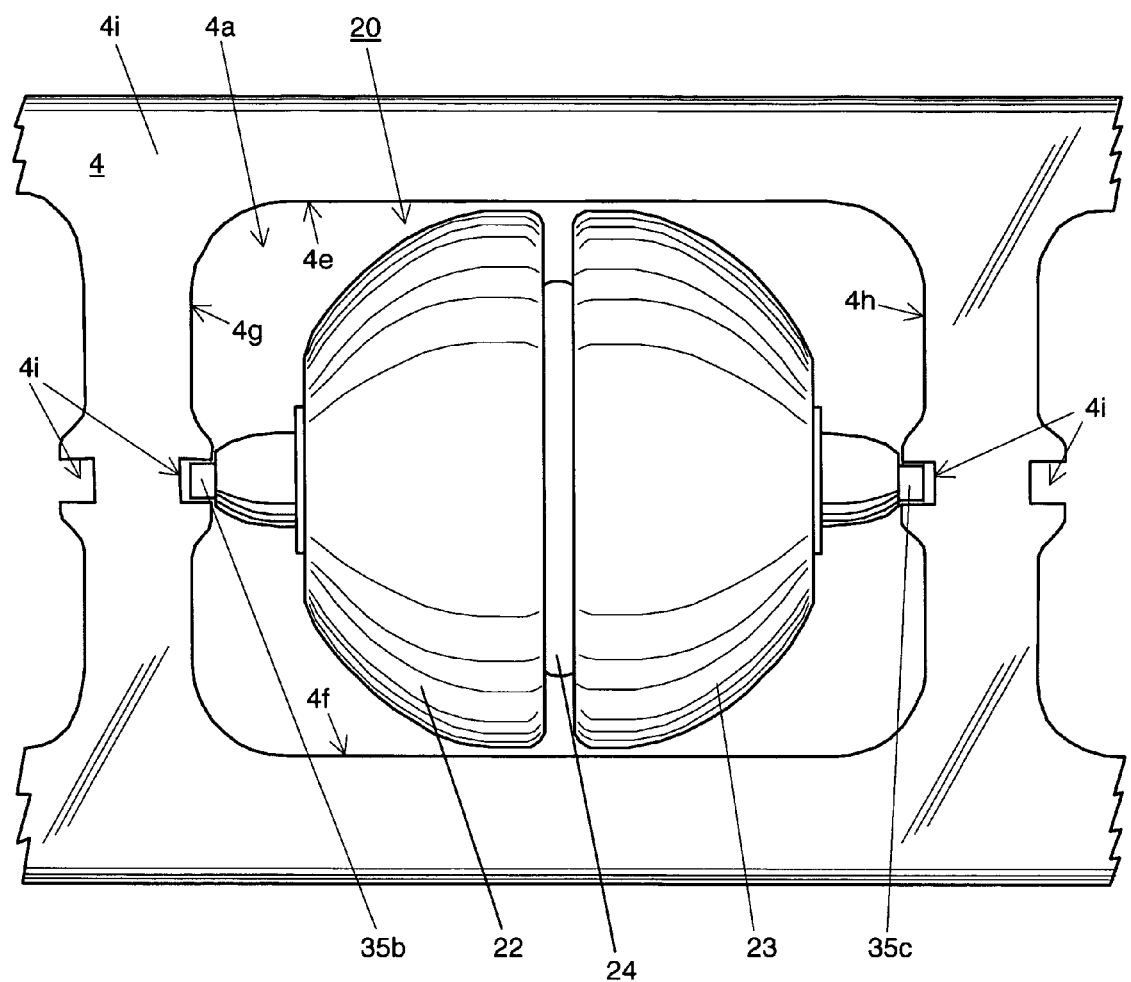
FIG. 9 shows a partially enlarged radial view of my invention in an actual use with a constant velocity joint (the outer and inner races are not shown), revealing the contacts between the slide shaft and the cage.

FIG. 9 shows a partially enlarged radial view of my invention in actual use with a constant velocity joint (the outer race 1 and inner race 2 are not shown here), revealing the contacts between the ball assembly 20 and the cage 4. As the cage 4 steers (moves) the multi-roller ball 20, the cage web grooves 4i push or pull the ball assembly 20 at the lugs 35b, 35c of the slide shaft 35.

From the foregoing it will be apparent that an apparatus and method have been disclosed which are fully capable of carrying out and accomplishing all of the objects and advantages taught by this invention. As many as possible embodiments may be made of the invention without departing from the scope thereof, it is to be understood that all matter herein set forth or shown in the accompanying drawings is to be interpreted as illustrative and not in a limiting sense. It will be understood that certain features and sub-combinations are of utility and may be employed without reference to other features and sub-combinations. This is contemplated by and is within the scope of the claims.

What I claim as my invention is:

1. A constant velocity joint comprising:
   an outer joint member having an inner surface formed with a plurality of circumferentially distributed ball grooves;
   an inner joint member having an outer surface formed with a plurality of circumferentially distributed ball grooves:
   a plurality of torque-transmitting ball assemblies disposed between the grooves of the outer and inner joint members, each of said ball assembly comprising:
      an annular slide shaft having a first and second lugs at the ends of said slide shaft,
      an annular roller shaft having an annular aperture for engaging the slide shaft and having an annular outer surface with a centrally positioned ridge forming a first and second tapered portions on each side of said ridge; and
      a first and second annular sub-rollers, each having an annular aperture for engaging the roller shaft, and a substantially spherical outer surface forming a running face against the inner or outer ball grooves; and
   a cage disposed between the inner and outer surfaces of the outer and inner joint members and having windows for receiving the ball assemblies and cage webs defined between said windows, said cage web includes a first and second web grooves disposed at the circumferential faces of said cage web extending radially from the inner surface of the cage to the outer surface of the cage.

2. The constant velocity joint according to claim 1, wherein said first and second lugs of the slide shaft engage the web grooves of the cage, making a slidable contact along said web groove, and thereby allowing a limited radial movement of the ball assembly relative to the cage window.

3. A constant velocity joint according to claim 1, wherein said roller shaft is made of a sliding bearing material to facilitate a smooth rotation of said sub-rollers.

4. A constant velocity joint according to claim 1, wherein each of said sub-rollers is supported by a needle bearings on respective roller shaft.

5. A constant velocity joint according to claim 1, wherein a first and second retaining rings are disposed at each of said roller shaft abutting the first and second sub-rollers and keeping the sub-rollers from sliding out of said roller shaft during an assembly process of the constant velocity joints.

6. A constant velocity joint according to claim 1, wherein each of said roller shafts is rotatable disposed between the respective slide shaft and the pair of sub-rollers so that said roller shaft can slide along and rotate about said slide shaft thereby allowing a limited circumferential movement of said sub-roller pair relative to the cage window.

7. A constant velocity joint according to claim 1, said first and second sub-rollers are rotatably supported on the first and second tapered portions of said roller shaft so that said first and second sub-rollers are independently rotatable relative to their respective roller shaft, thereby providing said inner or outer grooves with the independent rolling contacts against the running faces of the first and second sub-rollers.

8. A constant velocity joint according to claim 7, said running face of the first sub-roller and said running face of the second sub-roller form a single spherical surface.

* * * * *